Feb. 2, 1971 L. A. KNAPP 3,560,073
RETROREFLECTIVE SIGNAL DEVICE
Filed Dec. 19, 1968 2 Sheets-Sheet 1

INVENTOR.
LEROY A. KNAPP
BY
Norman S. Blodgett
ATTORNEY

Feb. 2, 1971     L. A. KNAPP     3,560,073
RETROREFLECTIVE SIGNAL DEVICE
Filed Dec. 19, 1968     2 Sheets-Sheet 2

United States Patent Office

3,560,073
Patented Feb. 2, 1971

3,560,073
RETROREFLECTIVE SIGNAL DEVICE
LeRoy A. Knapp, West Boylston, Mass., assignor to Machinery Electrification, Inc., Northboro, Mass., a corporation of Massachusetts
Filed Dec. 19, 1968, Ser. No. 785,283
Int. Cl. G02b 5/12
U.S. Cl. 350—97                                    2 Claims

ABSTRACT OF THE DISCLOSURE

This invention relates to a signal device and, more particularly, to apparatus for use in supplying a pattern of retroreflective spots in an automatic warehousing arrangement or the like.

BACKGROUND OF THE INVENTION

In a pattern-type retroreflective sensing system, such as is described in the patent of Edelman No. 3,144,926, a configuration of retroreflective elements is applied to an object to be identified. When the object arrives on a conveyor at a reading station, it passes in front of an array of sensing units. Each sensing unit emits a beam of light across the conveyor and, if a retroreflective element passes across the beam, the light will be returned and sensed. If the array of sensing units at a given station exactly matches the pattern of retroreflective elements on an object, the sensing units act on the object in a predetermined manner, such as by shunting it from the conveyor. Now, the retroreflective elements can be applied to the object in any one of several ways. For instance, they can be in the form of short lengths of pressure sensitive tape applied from a roll by a tape "shooter." This system would probably be used where the object is a cardboard carton that is going through the conveyor system only once. Where the object is a permanet container, such as a plastic tote box, that is to be used over and over again, it is sometimes economically feasible to fasten a permanent signal device to the container and, particularly, to make it possible to set up various patterns on a given container from time to time. However, such signal devices have, in the past, been quite expensive because of their complexity. In addition, they have easily been rendered inoperative under the rugged conditions prevalent in a warehouse. These and other difficulties experienced with the prior art devices have been obviated in a novel manner by the present invention.

It is, therefore, an outstanding object of the invention to provide a signal device which is simple and rugged in construction and is not easily rendered inoperative by dirt and blows.

Another object of this invention is the provision of a signal device that can be easily assembled by unskilled labor from mass-produced parts, such as metal stampings and molded plastic parts.

A further object of the present invention is the provision of a signal device which is very flat and can be applied to the side of a container without interfering with its use.

It is another object of the instant invention to provide a signal device which is inexpensive in construction and, therefore, is capable of extensive use.

With these and other objects in view, as will be aparent to those skilled in the art, the invention resides in the combination of parts set forth in the specification and covered by the claims appended hereto.

SUMMARY OF THE INVENTION

In general, the invention consists of a signal device having a main housing with a plurality of passages and an aperture entering each passage, a slide lying in each passage and movable between two positions in the passage, and a retroreflective element on each slide located to appear at the aperture when the slide is in one of the two positions.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 1:
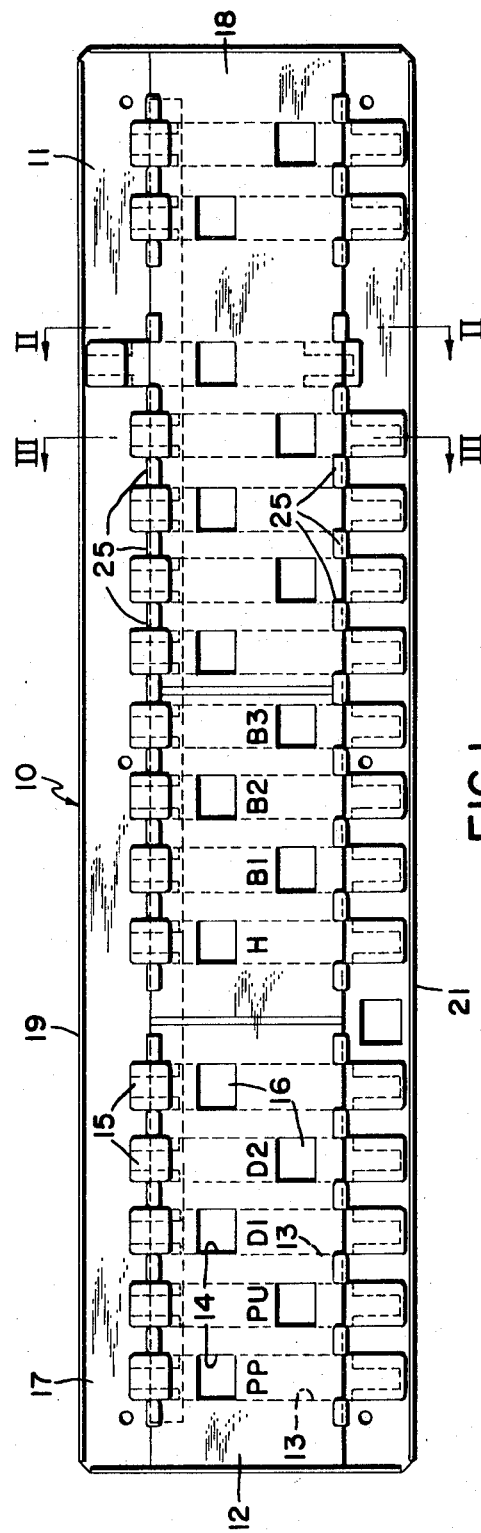
FIG. 1 is a front view of a signal device embodying the principles of the present invention.

Referring first to FIG. 1, wherein are best shown the general features of the invention, the signal device, indicated generally by the reference numeral 10, is shown as it would appear when attached to the side surface of a tote box (not shown). That is to say, it is of generally rectangular form with the long sides horizontal. It consists of a main housing 11 having a generally plane front face 12 and having a plurality of vertical passages 13 extending through the housing parallel to the front face. An aperture 14 extends from the front face into each passage.

Figure 2:
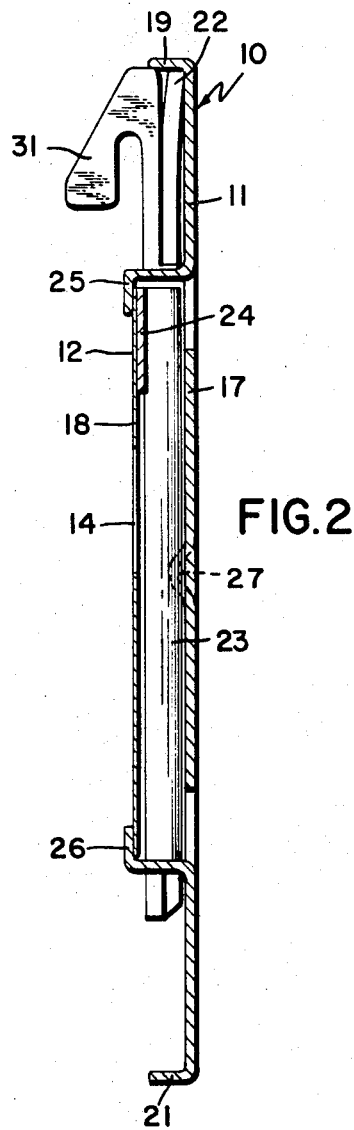
FIG. 2 is a vertical sectional view of the device taken on the line II—II of FIG. 1.
Figure 3:
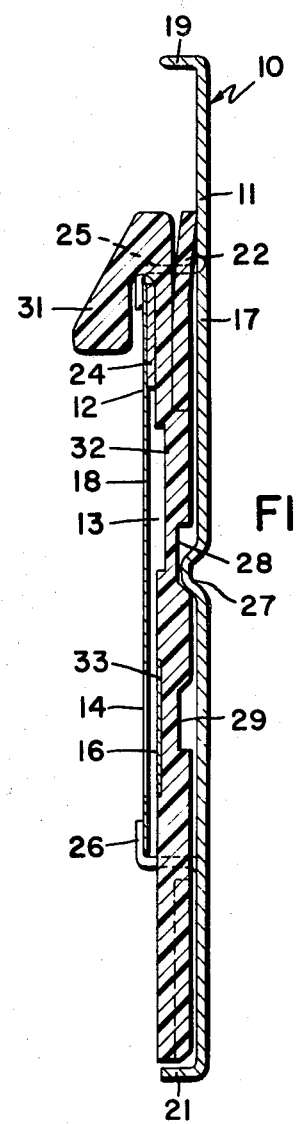
FIG. 3 is a vertical sectional view of the device taken on the line III—III of FIG. 1.
Figure 4:
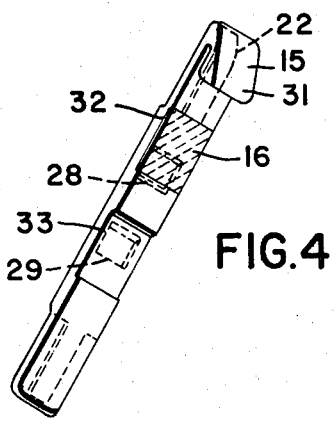
FIG. 4 is a perspective view of a slide used in the device.

A slide 15 lies in each passage and is slidable from a first position, as in FIG. 2, to a second position, as in FIG. 3. A retroreflective element 16 is mounted on a front surface of each slide and is located to appear at the aperture 14 when the slide is in the second position. The main housing 11 is formed from a rear plate 17 formed of stainless steel sheet and a front plate 18 which is a stiff sheet of plastic. These plates are held in spaced, parallel relationship with their inner facing surfaces defining the passages. The rear plate 17 is formed with flanges 19 and 21 along the long horizontal edges. These flanges serve to limit the vertical movement of the slides and, as a matter of fact, in the first position the upper end of the slide 15 resides close to the flange 19, while in the second position the lower end is close to the flange 21.

Referring to FIGS. 2 and 3, the distance between the rear plate 17 and the front plate 18 is greater than the thickness of the slide and a resilient finger 22 is formed integrally with the back of each slide to keep it pressed toward the front plate at all times.

As is evident in FIG. 2, the plates 17 and 18 are held in their spaced, parallel relationship by a plurality of metal dowels 23 located at appropriate positions along the housing. The dowels extend transversely across the housing and are all fastened by welding to a sheet metal strip 24 which extends along the rear upper surface of the front plate 18. Two spaced, parallel rows of lugs 25 and 26 are punched out of the rear plate 17 and extend forwardly over the upper and lower horizontal edges of the front plate 18. These lugs are then bent at right angles to lock over the front face of the front plate and hold it in place.

As is best shown in FIG. 3, the rear plate is provided with a forwardly-directed indentation or protuberance 27 which is engageable with either of two recesses 28 and 29 formed on the back surface of each slide. The recesses are located to determine the above-described first and second positions of the slide in its passage 13. Each slide 15 is provided at its upper end with a hook 31 that engages the upper edges of the front plate 18 and the metal strip 24 when the slide is in the second position, as shown in FIG. 3.

The operation of the invention will now be readily understood in view of the above description. The signal device 10 is fastened to the side of a container or tote box which is to be used in an automatic warehouse. Before the box is sent out into the conveyor system, the slides are arranged in various first or second positions to give exposure of various retroreflective elements 16 through their apertures 14 in a predtermined pattern that corresponds to the pattern of sensing devices at a particular station in the conveyor system. In the prefered embodiment shown in FIG. 1, the apertures 14 are arranged in two vertically-spaced horizontal rows. The retroreflective elements 16 are located on the face of each slide 15 in such a manner that the element 16 will be exposed in its aperture when the slide is in the second or lower position, irrespective of which row the aperture lies in. For that purpose, each slide is provided with two shallow recesses 32 and 33 on its front face to receive and protect a retroreflective element. If the slide is in its second position, the protuberance 27 will lie in the upper recess 28 and the hook 31 will engage the upper edges of the front plate 18 and the strip 24. When the strip is in its first position, the protuberance 27 resides in the lower recess 29, so that it requires a deliberate downward force to push the slide downwardly.

One of the advantages of the invention is that the reset pressure is very light but, nevertheless, the slides 15 will remain in the upper postion despite shock and vibration. The use of the inclined surface at the upper end of each slide means that any reset pressure will have two components, i.e., a vertical one and a horizontal one. This assures that buckling of the framework cannot take place because of excessive vertical reset pressure; any strong reset pressure will automatically result in a latch release pressure.

It is obvious that minor changes may be made in the form and construction of the invention without departing from the material spirit thereof. It is not, however, desired to confine the invention to the exact form herein shown and described, but is desired to include all such as properly come within the scope claimed.

The invention having been thus described, what is claimed as new and desired to secure by Letters Patent is:

1. A signal device adapted to be coded for reading in parallel rows, comprising
   (a) a main housing having a planar rear plate and a planar front plate disposed in parallel relationship,
   (b) tab means integral to said rear plate engaging said front plate,
   (c) spaced parallel dowel means positioned between said rear plate and said front plate to space said front plate from said rear plate thereby defining a plurality of parallel passages between said front plate and said rear plate,
   (d) a slide positioned within each of the passages, slidable within the passage beween a first position and a second position and provided with first and second spaced positioning recesses in the rear surface thereof,
   (e) a plurality of apertures in said front plate, each said aperture providing visible access to a corresponding passage,
   (f) positioning detent means on said rear plate in each passage engageable with said first and second positioning recesses on said slide to position the slide at a first or a second position,
   (g) a retroreflective element on the front surface of each said slide located to be visible through the corresponding aperture when the slide is in its second position and to be hidden from view through the aperture when the slide is in the first position,
   (h) a notch in the front surface of each said slide engageable with the top of said front plate when the slide is in its first postion to maintain the slide in said first position,
   (i) hook means on the upper portion of each said slide engageable with the top portion of said front plate to limit the travel of said slide from its first position to its second position, and
   (j) sloping surface means on said hook means operable upon the application of manual pressure to cause the notch in the front surface of said slide to disengage from the top of said front plate whereby the slide is disposable from its first position to its second position.

2. The signal device of claim 1, wherein each said slide includes resilient means bearing against the rear plate and urging the slide against the front plate.

References Cited

UNITED STATES PATENTS

| | | | |
|---|---|---|---|
| 2,770,898 | 11/1956 | Lutz et al. | 40—17X |
| 3,144,926 | 8/1964 | Edelman | 250—223X |
| 3,227,886 | 1/1966 | Dunigan et al. | 198—38X |

DAVID H. RUBIN, Primary Examiner

U.S. Cl. X.R.

250—219; 198—38; 40—18